Figure 1:
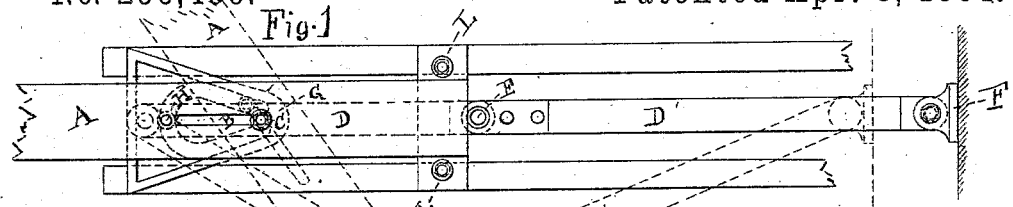

(No Model.) 2 Sheets—Sheet 1.

D. W. & W. W. SEELEY.
LEVER POWER.

No. 296,466. Patented Apr. 8, 1884.

Witnesses
Julius F. Harris
Edwin G. Day

Inventors.
David W. Seeley
William W. Seeley (No Model.) 2 Sheets—Sheet 2.

D. W. & W. W. SEELEY.
LEVER POWER.

No. 296,466. Patented Apr. 8, 1884.

Witnesses
Julius F. Harris
Edwin G. Day

Inventors,
David W. Seeley
William W. Seeley

UNITED STATES PATENT OFFICE.

DAVID W. SEELEY AND WILLIAM W. SEELEY, OF ALBANY, NEW YORK, ASSIGNOR OF ONE-FOURTH TO WILLIAM H. KING, OF SAME PLACE.

LEVER-POWER.

SPECIFICATION forming part of Letters Patent No. 296,466, dated April 8, 1884.

Application filed January 7, 1884. (No model.)

*To all whom it may concern:*

Be it known that we, DAVID W. SEELEY and WILLIAM W. SEELEY, both citizens of the United States, and residing in the city and county of Albany and State of New York, are the joint inventors of a certain new Improvement in Lever-Power; and we do hereby declare that the principles, elements, and combination of and in our said joint invention are hereinafter so fully described and pointed out in the drawings accompanying this specification that any one skilled in the art to which our invention more nearly relates may be able to construct and operate the same, reference being had to the specification and the drawings accompanying the same.

Our joint invention relates to that class of levers which is usually denominated a "knuckle-joint" lever.

Heretofore the levers denominated as aforesaid have been made so that one arm thereof shall be permanently fastened by means of a pin or bolt to the machine or apparatus upon or in connection with which such lever is used, so that while such arm may be turned in a circle it cannot be moved in the direction of its length, the pin or bolt being one of the points against which the lever is pressed when both arms constituting such knuckle-joint shall be in a continuous straight line, and also so constructed as that the moving power shall be attached to one end of one of said arms.

The objects of our joint invention are to afford more room in the pressing-chamber of the machine or apparatus to which the lever is attached by bringing the two arms forming the knuckle-joint nearly parallel with each other; also, to gain more power, and also to increase the throw of the arm, which enters the pressing-chamber when the power which moves the lever is lessened, and also to shorten the lever as the power applied thereto increases.

The manner of constructing and operating our said invention is described in the two following ways, reference being had to the accompanying drawings, in which similar letters indicate like parts, and in which—

Figure 2:
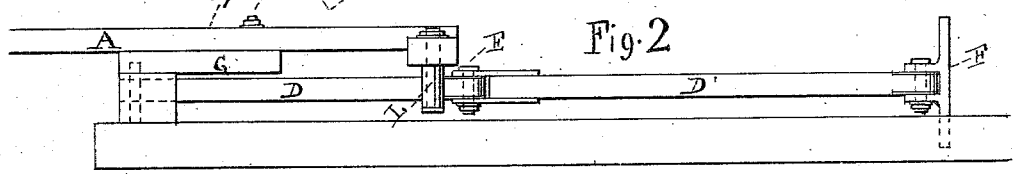
Figure 3:
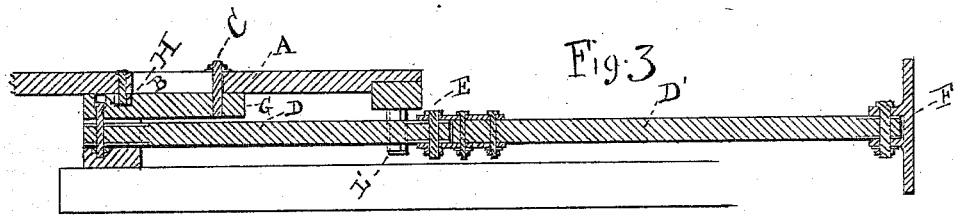
Figure 4:
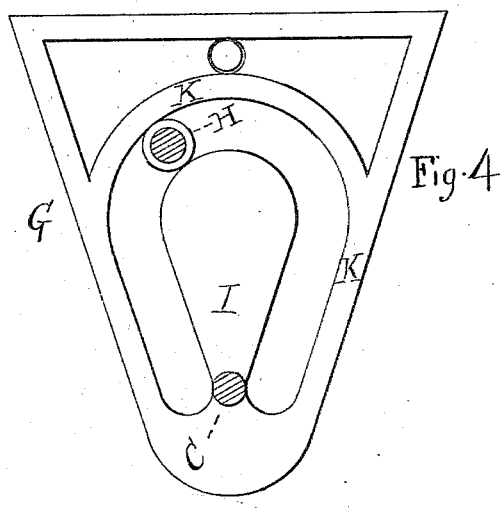
Figure 5:
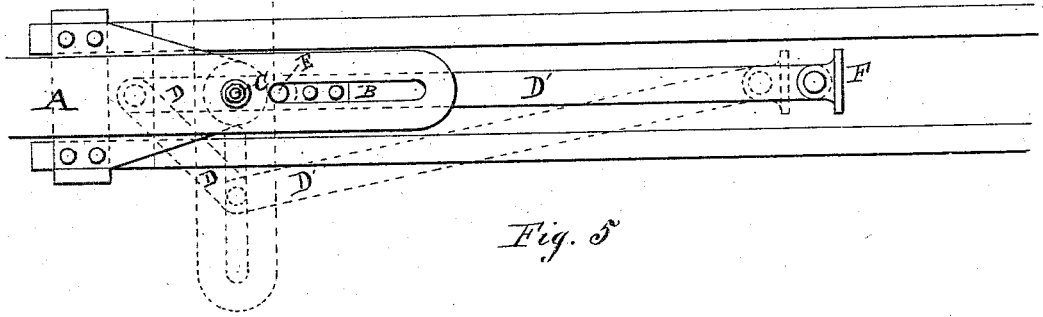
Figure 6:
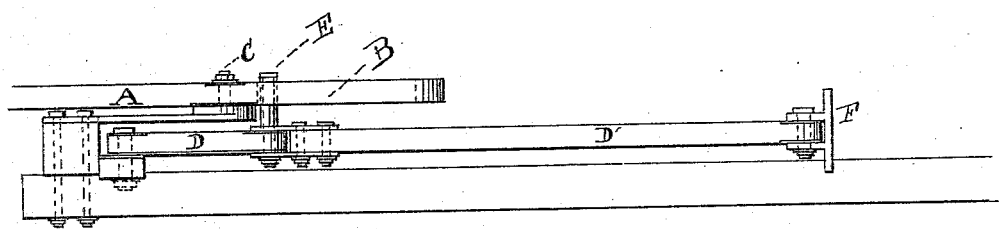
Figure 7:
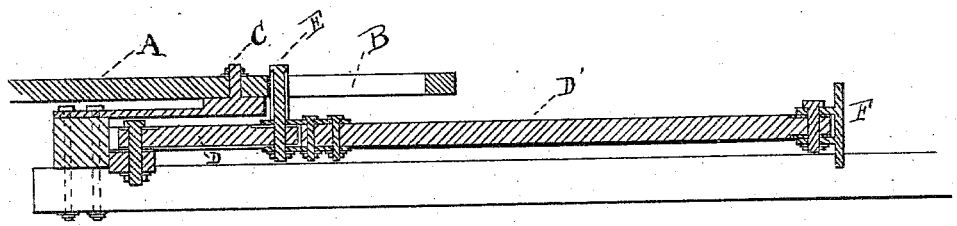

Figure 1 is a plan view of said lever and apparatus as constructed in the manner first hereinafter described. Fig. 2 is a side elevation of said lever and apparatus as constructed in the manner first hereinafter described. Fig. 3 is a longitudinal sectional view of the lever and apparatus as constructed in the manner first hereinafter described. Fig. 4 is a plan view of the plate upon which the wheels placed on the sweep revolve. Fig. 5 is a plan view of said lever as constructed in the manner secondly hereinafter described. Fig. 6 is a side elevation of said lever and apparatus as constructed in the manner secondly hereinafter described. Fig. 7 is a longitudinal sectional view of the lever as constructed in the manner secondly hereinafter described.

A is a sweep, which moves with and acts upon the arms which form the knuckle-joint, and in which is cut a slot, B, into or through which passes a pin or bolt, C. D and D' are the arms of the lever which form the knuckle-joint; E, the pin or rod passing through both of the arms D and D' at and forming the knuckle-joint; F, the head of one of the arms D', fastened thereto by means of a bolt or pin, forming, with said arm, thereby another knuckle-joint; G, the plane under part of the sweep A, over which the small wheel H, attached to the sweep A passes, when the said A turns on its pin or bolt; I, a part of a circle or ellipse, against which the wheel H revolves until it strikes either of the pieces of metal or wood, K, on the sides of the plane G. L L' are one or more rods or rollers properly affixed to the end of said lever A, and which are upon both sides of one of the arms D.

When in operation, in the act of pressing, and the sweep has been extended so that its length is in a line parallel with the arms D, the small wheel H rests and presses against the part of the circle or ellipse I, and when the lever is turned in either direction the wheel revolves around said circle until it reaches the turned-up edges or sides of the plane G, or pieces of wood or metal, K, affixed to the sides of or upon the top of said plane G, the said sides or pieces being constructed in such a manner as that the inner faces would, if prolonged, meet at any angle of ninety degrees or less when the wheel passes along such inner face of such turned-up sides of said plane or of said pieces affixed to or upon said plane. As the small wheel passes along the sides or pieces K, the sweep A must necessarily slip on the pin or bolt E in the slot B, and by extending itself in the direction of its length must necessarily bring the arms D D', almost parallel to each other. The arm D being now withdrawn almost entirely from the pressing-chamber, more space is allowed therein to insert material to be pressed than otherwise could be obtained.

We sometimes construct the lever by merely attaching one end of the slotted sweep A to one of the arms D which enter the pressing-chamber, thereby forming with said arm a knuckle-joint. In the latter case we do not affix to the sweep A the rods or rollers L.

Our second method of constructing our said invention is as follows: We permanently secure by means of a rod or spindle the sweep to the front part of the machine upon and in connection with which the lever is to be used in such a manner as that the sweep will turn upon said rod or spindle as a pivot. A slot cut in the said sweep passes over a rod which has been placed in the end of one of the levers, at or near its end which forms the knuckle-joint, the other end of one of the said levers being secured by a proper joint to a plunger, and the other end of the second lever being secured by a proper joint at the front of the machine to or near the point where the rod or spindle which holds the sweep, and around which the latter turns, is fixed to said machine. When the sweep is turned, it presses by means of said slot against the rod in the end of one of said levers, and causes the said arms of said lever to move.

Having described our said invention, what we claim, and desire to secure by Letters Patent, is—

1. A lever-power consisting of a slotted sweep and two arms of any material, the two ends of which arms, being fastened together, form a knuckle-joint, the sweep being held in position by means of a pin or bolt, which pin or bolt can be passed through the slot therein to keep such arm from moving sidewise, and underneath which said sweep having the slot shall be a wheel, which wheel shall revolve against a part of a circle or ellipse forming the side or end of a plane of any material under said sweep opposite to the knuckle-joint, and then against either of the turned-up edges or sides of said plane or against pieces of any material affixed to or upon said plane, and which sweep shall have at one of its ends rods or rollers, substantially as described, and for the purpose set forth.

2. In a lever used for pressing purposes, the combination of a sweep forming such lever, in which shall be a slot through which a pin or bolt passes to prevent a lateral motion of said arm, and a wheel affixed to and placed either underneath or on top of such sweep, as described, and for the purposes set forth.

3. In a lever used for pressing purposes, the combination of a sweep forming such lever, having a slot therein, a wheel affixed to and placed either on top or underneath said sweep, and a plane of any material placed either above or below said lever, the end of which opposite the knuckle-joint in said lever shall either be turned up in the form of part of a circle or ellipse, or to or upon which such end shall be affixed a piece of metal or wood to form a part of a circle or ellipse, and the edges of said plane adjoining said part of the said circle shall either be turned up, or along or upon the sides of said plane shall be affixed pieces of any material in such a manner as that the inner faces of said turned up edges or of said pieces, if prolonged, would form an angle of ninety degrees or less, substantially as described, and for the purposes set forth.

4. In a lever used for pressing purposes, the combination of a sweep forming such lever, having a slot therein, and having at one end thereof rods or rollers, one of which is held in position on each side of one of the arms forming the knuckle-joint of such lever, and a wheel affixed to and placed either on top or underneath said lever, and a plane of any material placed either above or below said sweep, substantially as described, and for the purposes above set forth.

5. A sweep for a lever, made of any material, constructed with a slot therein, for the purposes above set forth.

6. A lever consisting of a sweep constructed with a slot therein and turning around a pivot, and the two arms joined together, and which form a knuckle-joint, in one of which arms, at or near the knuckle-joint, shall be a rod or pin, which is inserted into the slot in said sweep, and is acted upon by said sweep to turn the said arms of said lever, for the purposes above described.

7. In a lever for pressing purposes, the plane which is placed between the sweep which moves upon a pivot, and has a slot therein, and the end of one of the arms of said lever, which, with the other arm, forms a knuckle-joint for the purposes above described.

8. In a lever for pressing purposes, the combination of the slotted sweep moving on a pivot, and the plane underneath and upon which said sweep is placed and to which said sweep is affixed, for the purposes above set forth.

DAVID W. SEELEY.
WILLIAM W. SEELEY.

Witnesses:
EDWIN G. DAY,
JULIUS F. HARRIS.